United States Patent
Zhou

(10) Patent No.: US 9,960,857 B2
(45) Date of Patent: *May 1, 2018

(54) SYSTEM AND METHOD FOR BLIND FREQUENCY RECOVERY

(71) Applicant: AT & T Intellectual Property I, L.P., Atlanta, GA (US)

(72) Inventor: Xiang Zhou, Holmdel, NJ (US)

(73) Assignee: AT & T INTELLECTUAL PROPERTY I, L.P., Atlanta, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/720,171

(22) Filed: May 22, 2015

(65) Prior Publication Data

US 2015/0256269 A1 Sep. 10, 2015

Related U.S. Application Data

(63) Continuation of application No. 13/048,630, filed on Mar. 15, 2011, now Pat. No. 9,042,741.

(51) Int. Cl.
*H04B 10/06* (2006.01)
*H04B 10/61* (2013.01)
(Continued)

(52) U.S. Cl.
CPC ..... *H04B 10/6165* (2013.01); *H04B 10/0795* (2013.01); *H04B 10/6164* (2013.01); *H04L 7/0075* (2013.01); *H04L 27/0014* (2013.01); *H04L 2027/0028* (2013.01); *H04L 2027/0034* (2013.01); *H04L 2027/0065* (2013.01);
(Continued)

(58) Field of Classification Search
CPC ........... H04B 10/0795; H04B 10/6164; H04B 10/6165; H04L 27/0014; H04L 2027/0028; H04L 2027/0034; H04L 2027/0065; H04L 2027/0085
USPC ........ 398/25, 154, 155, 202, 203, 208, 209; 375/320–376

See application file for complete search history.

(56) References Cited

U.S. PATENT DOCUMENTS

| | | | | |
|---|---|---|---|---|
| 9,042,741 B2 * | 5/2015 | Zhou | ........ | H04B 10/0795 375/326 |
| 2010/0118891 A1 * | 5/2010 | Nakajima | ........ | H04L 12/4633 370/474 |
| 2011/0085797 A1 * | 4/2011 | Xu | ........ | H04B 10/60 398/27 |

OTHER PUBLICATIONS

Pfau et al: "Hardware-Efficient Coherent Digital Receiver Concept With Feedforward Carrier Recovery for M-QAM Constellations", Journal of Lightwave Technology, vol. 27, No. 8, Apr. 15, 2009, pp. 989-999.*

* cited by examiner

*Primary Examiner* — Li Liu
(74) *Attorney, Agent, or Firm* — Fay Kaplun & Marcin, LLP

(57) ABSTRACT

Described herein are systems and methods for accurately estimating and removing a carrier frequency offset. One exemplary embodiment relates to a system comprising a frequency offset detection circuit detecting a carrier frequency offset in an optical signal, and a frequency testing circuit calculating an estimated frequency offset value of the carrier frequency offset, wherein the frequency testing circuit removes a carrier phase based on the estimated frequency offset value and recovers the optical signal. Another exemplary embodiment relates to a method comprising detecting a carrier frequency offset in an optical signal, calculating an estimated frequency offset value of the carrier (Continued)

frequency offset, removing a carrier phase based on the estimated frequency offset value, and recovering the optical signal.

20 Claims, 7 Drawing Sheets

(51) Int. Cl.
    *H04B 10/079*     (2013.01)
    *H04L 27/00*     (2006.01)
    *H04L 7/00*     (2006.01)
(52) U.S. Cl.
    CPC ................ *H04L 2027/0067* (2013.01); *H04L 2027/0085* (2013.01)

SYSTEM AND METHOD FOR BLIND FREQUENCY RECOVERY

PRIORITY CLAIM/INCORPORATION BY REFERENCE

This application is a Continuation application of U.S. patent application Ser. No. 13/048,630, now U.S. Pat. No. 9,042,741, issued on May 26, 2015, filed on Mar. 15, 2011 entitled "System and Method for Blind Frequency Recovery". The entire disclosure of this prior application is considered as being part of the disclosure of the accompanying applications and hereby expressly incorporated by reference herein.

BACKGROUND

Within digital and optical communications systems, a carrier frequency offset may refer to a difference between the carrier frequency at a transmitter and the carrier frequency at the receiver. For instance, the transmitter may transmit at the nominal carrier frequency. At the receiver, an unmodulated frequency may be required for reception of the transmission, however it may not be physically possible to have the carrier frequency at the receiver exactly match the carrier frequency at the transmitter. Thus, this offset between frequencies may be described as the carrier frequency offset. Causes for this offset may include temperature change, mechanical vibration and etc. Accordingly, reduction of the carrier frequency offset through frequency and phase tracking (e.g., frequency recovery) may greatly improve the overall performance of the digital communications system.

Typically, a carrier recovery system may be used to estimate and compensate for frequency and phase differences between a carrier wave of a received signal and a local oscillator of the receiver for the purpose of coherent demodulation. While carrier recovery may be accomplished with an optical phase-locked loop ("PLL"), these methods are very complex. Conventional digital PLL-based blind carrier recovery algorithms have the capability to recover carrier phase and frequency simultaneously, and thus, is widely used for wireless systems. However, these types of algorithms cannot be used for high-speed optical system.

Unlike the wireless system in which the frequency and phase offset changes are relatively similar and slow, the characteristics of frequency and phase offsets in the optical system are very different. For example, frequency change is relatively slow (e.g., typically in the milliseconds for high-quality lasers) but the range may be large (e.g., more than 100 MHz), while the carrier phase varies much faster as compared to the wireless systems (e.g., within the nanosecond). Such characteristics will make PLL-based algorithms perform poor due to the intrinsic feedback delay. Furthermore, optical systems typically require heavily parallel processing that may further degrade the performance of these PLL-based algorithms.

SUMMARY

Described herein are systems and methods for accurately estimating and removing a carrier frequency offset. One exemplary embodiment relates to a system comprising a frequency offset detection circuit detecting a carrier frequency offset in an optical signal, and a frequency testing circuit calculating an estimated frequency offset value of the carrier frequency offset, wherein the frequency testing circuit removes a carrier phase based on the estimated frequency offset value and recovers the optical signal.

Another exemplary embodiment relates to a method comprising detecting a carrier frequency offset in an optical signal, calculating an estimated frequency offset value of the carrier frequency offset, removing a carrier phase based on the estimated frequency offset value, and recovering the optical signal.

A further exemplary embodiment relates to a circuit comprising a detecting means detecting a carrier frequency offset in an optical signal, a calculating means calculating an estimated frequency offset value of the carrier frequency offset, a phase removal means removing a carrier phase based on the estimated frequency offset value, and a signal recovering means recovering the optical signal.

DETAILED DESCRIPTION

Figure 1:
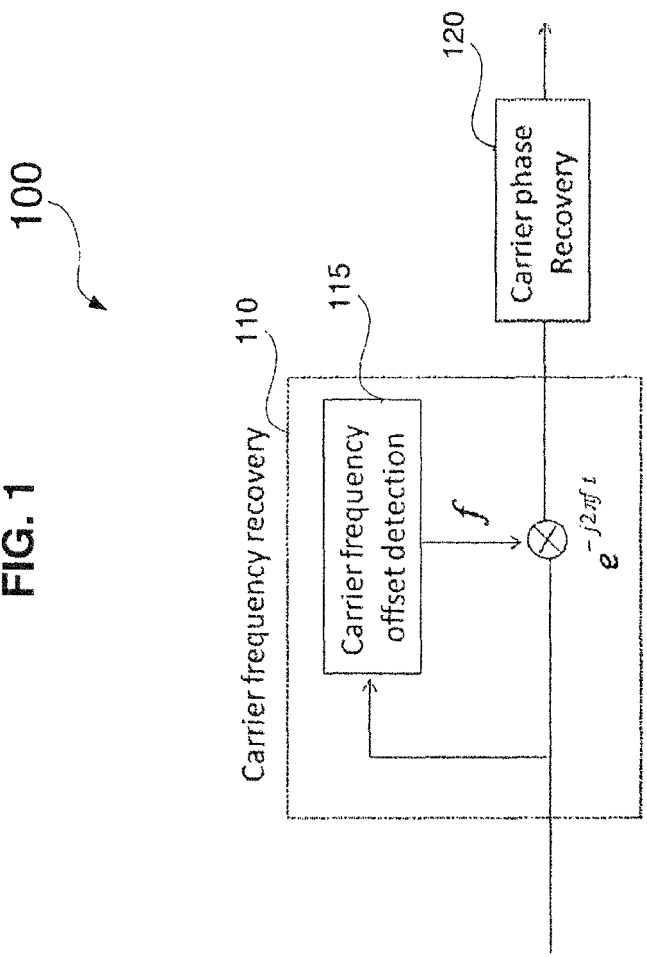
FIG. 1 shows an illustration of the basic structure of carrier recovery for an optical system according to an exemplary embodiment described herein.

The exemplary embodiments described herein may be further understood with reference to the following description and the related appended drawings, wherein like elements are provided with the same reference numerals. The exemplary embodiments are related to systems and methods for accurately estimating and removing a carrier frequency offset.

The exemplary systems and methods described herein provide for a multi-stage blind frequency search process for a universal blind carrier frequency recovery method for a coherent receiver. As will be described below, the coherent receiver may employ any type of modulation format, such as an arbitrary quadrature amplitude modulation ("QAM") format, a polarized-multiplexed QAM format, etc. The exemplary embodiments may accurately estimate the carrier frequency offset by using only tens of continuous symbols, and therefore may be implemented with either a parallel processing-based architecture or a sequential processing-based architecture. While the parallel processing architecture may allow for relatively faster carrier frequency recovery, the sequential processing architecture may allow for very hardware-efficient carrier frequency recovery. Furthermore, by using a combination of both the parallel and sequential processing architectures, the tracking speed as well as hardware-efficiency may therefore be adjusted in order to meet the needs of different system applications.

In order to meet the growing capacity demands in the core optical network, spectrally efficient techniques, such as digital coherent detection may be implemented. While these techniques allow the use of advanced modulation formats (e.g., QAM-modulated systems), high order QAM modulation formats, such as M>4, have smaller tolerance toward frequency and phase noise due to decreases in the Euclidian distance, and thus require more robust frequency and phase tracking (e.g., carrier recovery). Although frequency and phase tracking may be realized by using training based algorithms, these algorithms require extra overhead and thus reduce the achievable spectral efficiency ("SE"). On the other hand, blind carrier recovery does not require overhead and may be more attractive for an optical system.

For optical systems, most of the proposed carrier recovery algorithms may only be applicable to phase-shift-keying ("PSK") systems. For instance, a fast Fourier transform ("FFT") based carrier frequency recovery algorithm may be extended from a PSK system to a high-order QAM system, but the required FFT size would be very large. An improved algorithm may be created by proposing a ring-based classification and down-sampling method that can significantly reduce the required FFT size. Accordingly, this improved method may provide a solution for a continuously operational receiver using a high-quality laser (e.g., such as external cavity lasers) with very slow frequency noise. However, this method may not be used for a system using lasers having fast frequency noise, such as some distributed Bragg reflector ("DBR") lasers. Even with such high-quality lasers, there exists a need for fast carrier recovery for a fully dynamic optical network, wherein fast wavelength provisioning may be necessary, or for an optical packet network requiring burst-mode receivers. The exemplary embodiments described herein provide a more universal blind carrier recovery technique within a variety of networks and applications.

FIG. 1 shows an illustration of the basic structure of carrier frequency recovery for an optical system 100 according to an exemplary embodiment described herein. As is shown in FIG. 1, carrier frequency recovery 110 may include a circuit 115 for the detection of carrier frequency offset and its removal to achieve efficient carrier phase recovery 120. However, the challenging part is how to accurately estimate the carrier frequency offset.

According to the exemplary systems and methods, the optical system 100 may use a multi-stage based blind frequency search method to detect the carrier frequency offset. As will be described in greater detail below, this system 100 may utilize a variety of frequency testing components to accurately estimate carrier frequency offset. Specifically, these frequency-testing components may use a small number of symbols (e.g., on the order of only tens of symbols), which may only account for nanoseconds for the high-speed optical system 100. Therefore, the number of symbols used is much less than any conventional carrier recovery algorithm, wherein thousands of symbols are typically required to achieve a reliable carrier frequency. Thus, if the exemplary method is realized by using a parallel processing-based architecture, very fast carrier frequency recovery may be achieved. In addition, since the exemplary method may only need a short piece of data information for carrier frequency offset extraction, it may also be implemented with a sequential processing architecture to achieve very hardware-efficient carrier frequency recovery. By using a combination of parallel and sequential processing architecture, the tracking speed as well as hardware-efficiency can therefore be adjusted to meet the needs of different system applications.

Figure 2:
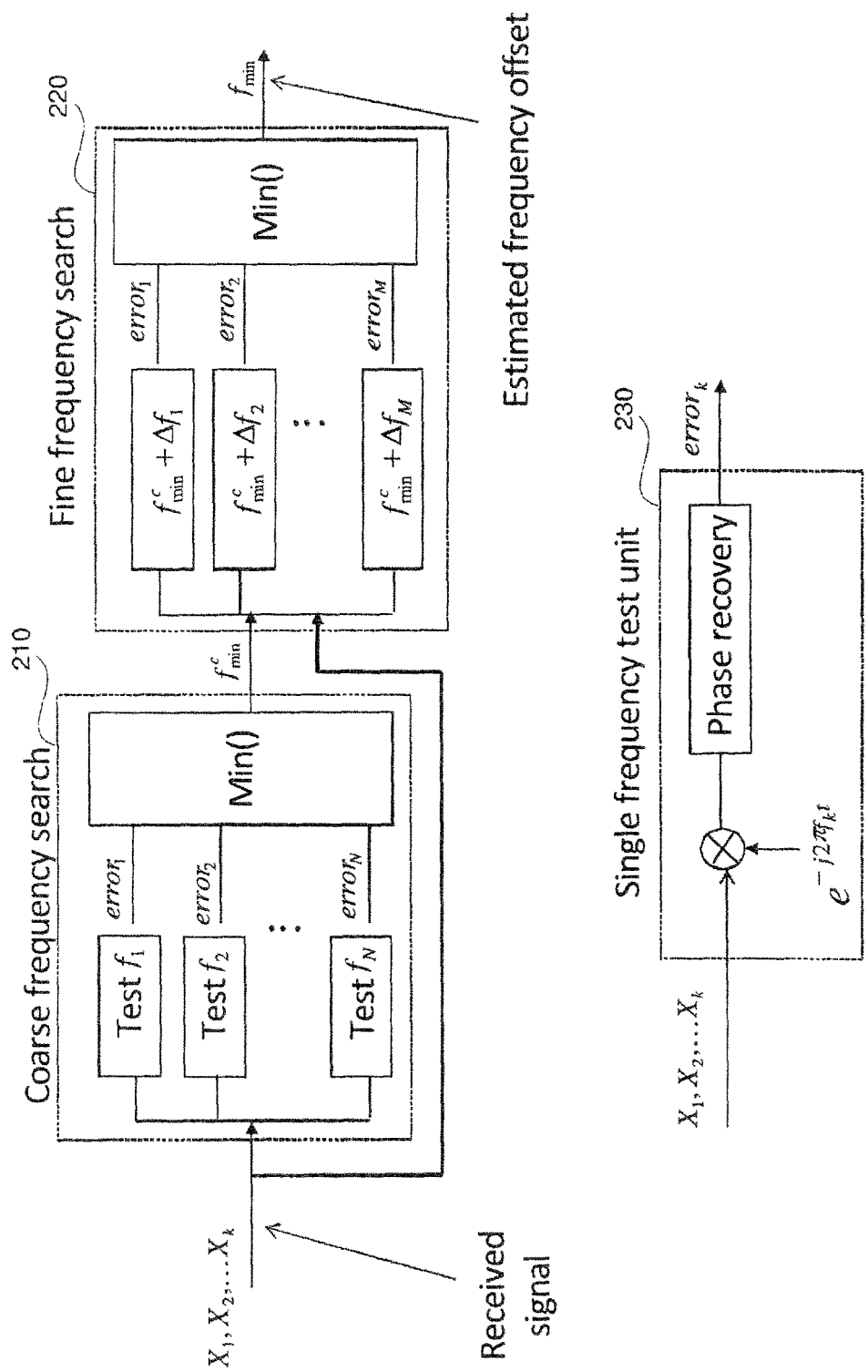
FIG. 2 shows an illustration of a first embodiment of a carrier frequency offset detection system according to systems and methods described herein.

FIG. 2 shows an illustration of a first embodiment of a carrier frequency offset detection system 200 according to systems and methods described herein. As shown in FIG. 2, a two-stage based blind frequency search method may be utilized with a parallel processing architecture. The two stages may include a coarse frequency search stage 210 and a fine frequency search stage 220. For descriptive purposes, "$X_1, X_2, \ldots X_K$" may denote the received modulated signal samples after equalization (e.g., one sample per symbol) to be used for frequency offset detection. In addition, "K" denotes the data block length, and "$f_1, f_2, \ldots f_n$" denotes the N different test frequencies used in the first coarse frequency search stage 210. According to the example depicted in FIG. 2, if the allowable maximum carrier frequency offset is $F_{max}$, then the test frequency $f_k$ that is used for the coarse frequency recovery may be selected as:

$$f_k = F_{max} + k\Delta F,$$

Wherein $\Delta F$ is the coarse frequency resolution, and k is an integer number taken from 0 to the nearest integer number closest to $F_{max}/\Delta F$.

For each frequency test unit, the K received signal samples are rotated by a phase angle given by $-2\pi f_k t$ wherein t denotes the sample instant. Accordingly, such a phase rotation operation may remove the frequency offset if the tested frequency $f_k$ is equal to the actual frequency offset. The phase-rotated signal may then go through a phase recovery stage to remove the carrier phase and recover the original signal (e.g., in a best effort). The exemplary phase recovery stage may include either a single-stage based blind phase search ("BPS") method 230 or a multi-stage hybrid BPS and maximum likelihood (ML) method in order to remove the carrier phase.

Furthermore, a mean square error may then calculated by:

$$\frac{\sum_{i=1}^{K} |X_k - X_k^D|^2}{K}$$

wherein $X_k^D$ denotes the decided signal. By using the parallel processing depicted in FIG. 2, each of the N frequencies may be tested at the same time and the N output mean square errors may then be compared. The test frequency that gives the minimum mean square error value may output to the next fine frequency search stage. For the fine frequency search stage 220, the M fine test frequencies may be chosen as $f_n = f_{min}^c + \Delta f_n$ wherein $\Delta f_n$ is given by:

$$\Delta f_n = -0.5\Delta F + n\frac{\Delta F}{M}$$

Wherein n is an integer number taken from [0,M]. The mean square errors calculated from the M fine test frequencies may be compared and the test frequency that gives the minimum mean square error value may be determined as the final estimated frequency offset. Specifically, an exemplary circuit within the system 200 may perform the calculations and estimations of the frequency offset.

Figure 3:
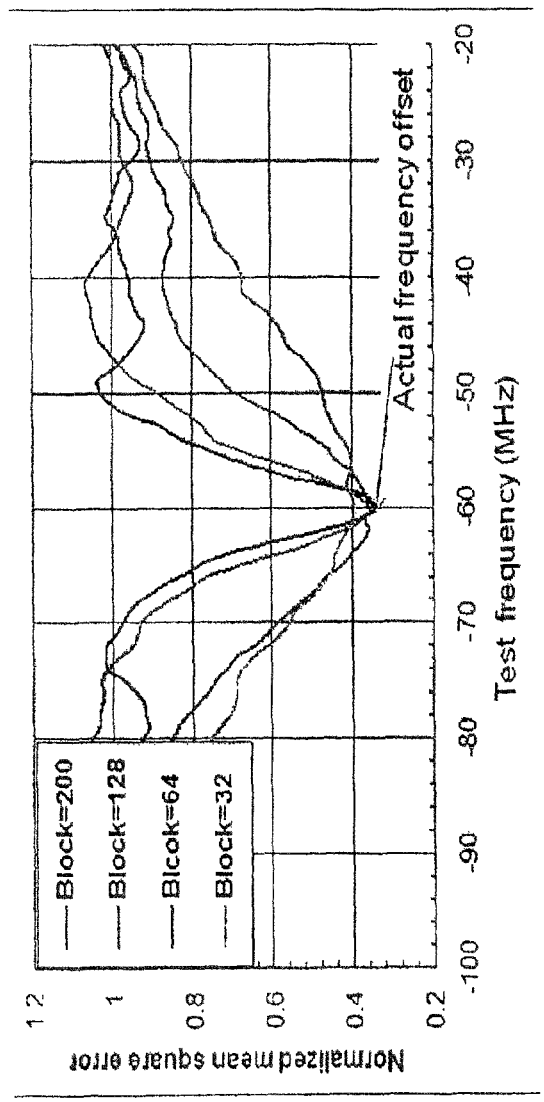
FIG. 3 shows an exemplary graph including the calculated mean square error versus test frequencies at 1 MHz frequency step according to an exemplary embodiment.

FIG. 3 shows an exemplary graph 300 including the calculated mean square error versus test frequencies at 1 MHz frequency steps according to an exemplary embodiment. As shown in FIG. 3, the Y-axis includes normalized mean square error while the X-axis includes the test frequencies at 1 MHz frequency step using different number of continuous data symbols based on a 10.7 Gbaud 36 QAM experimental result.

The graph 300 of FIG. 3 represents the results of a 107 Gb/s PDM-36QAM transmission experiment using external excavity lasers having a linewidth of ~100 kHz as the laser sources. In order to observe the allowable minimum data length and the allowable maximum coarse frequency search step (e.g., resolution), the graph 300 illustrates the calculated mean square error versus test frequencies at 1 MHz frequency steps using a different number of continuous data symbols (e.g., block length) for a 10.7 Gbaud 36QAM experiment operating with an optical signal-to-noise ratio ("OSNR") of 20.3 dB, corresponding to a BER of $1.3e^{-3}$. It can be seen that by using 64 continuous data symbols with a coarse frequency resolution of about 20 MHz and a fine frequency resolution 1 MHz, reliable carrier recovery may be achieved to within 1-2 MHz. Accordingly, estimating the frequency offset to within 2 MHz allows for very efficient carrier phase recovery. If the maximum carrier frequency offset is controlled to be below 200 MHz, such as some commercial products, the proposed two-stage blind frequency search systems and methods may only need to test a small number (e.g., about 40) of different frequencies by using the above introduced two-stage frequency search technique. Furthermore, the required number of test frequencies may be further reduced by introducing additional cascaded stages. For instance, if a frequency step of 20 MHz is selected for the first stage, a frequency step of 5 MHz is selected for the second stage and a frequency step of 1 MHz is selected for the final fine-tuning stage, then the required number of test frequencies may be reduced from 40 to 29.

Since the data length for detecting carrier frequency offset (e.g., K) may be small (on the order of tens of symbols), the parallel processing embodiment of the frequency offset detection method may be much faster than any of the known carrier frequency recovery methods, such as the FFT-based methods discussed above. Accordingly, the parallel processing embodiment may be of significant use to system applications, such as a burst-mode receiver, any continuously operational receiver requiring fast acquisition time, etc.

Figure 4:
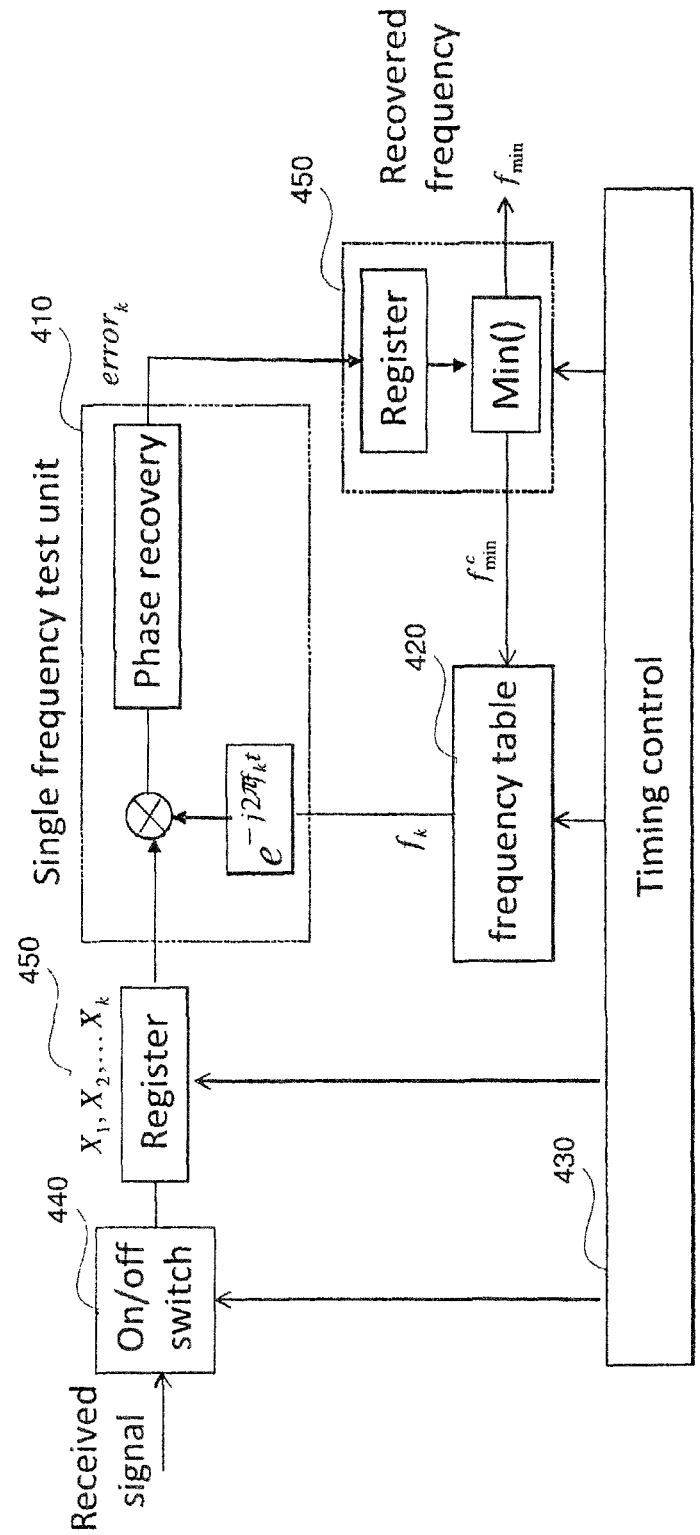
FIG. 4 shows an illustration of a second embodiment of a carrier frequency offset detection system according to systems and methods described herein.

FIG. 4 shows an illustration a second embodiment of a carrier frequency offset detection system 400 according to systems and methods described herein. The exemplary system 400 may include a single frequency test unit 410, a frequency table 420, a timing control 430, an on/off switch 440, and a plurality of registers 450.

Unlike the previous parallel processing architecture, detailed in the system 200 of FIG. 2, where the number of frequency test units is equal to the number of the used test frequencies, the system 400 may utilize the single frequency test unit 410. Furthermore, the mean square errors of different test frequencies may be calculated sequentially, at different time slots, by using the same frequency test unit 410. This exemplary sequential design may dramatically reduce the required hardware complexity due to a significant reduction in the amount of multiplier operations. An exemplary circuit within the system 400 may perform the calculations and estimations of the frequency offset.

Although this sequential processing architecture may use additional memory and a timing control unit, the complexity of the implementation is much less than that of the extra multiplier operation used in the parallel processing architecture of system 200. Accordingly, the exemplary system 400 depicted in FIG. 4 may use fewer components (e.g., complementary metal-oxide-semiconductor ("CMOS") gates, etc.) than the parallel processing architecture of the system 200. Thus, the system 400 may be described as very efficient in terms of its hardware design, although its frequency tracking speed may be reduced. Therefore, the sequential processing embodiment illustrated in FIG. 4 may be of significant use in a continuously operational receiver that does not require fast acquisition.

Figure 5:
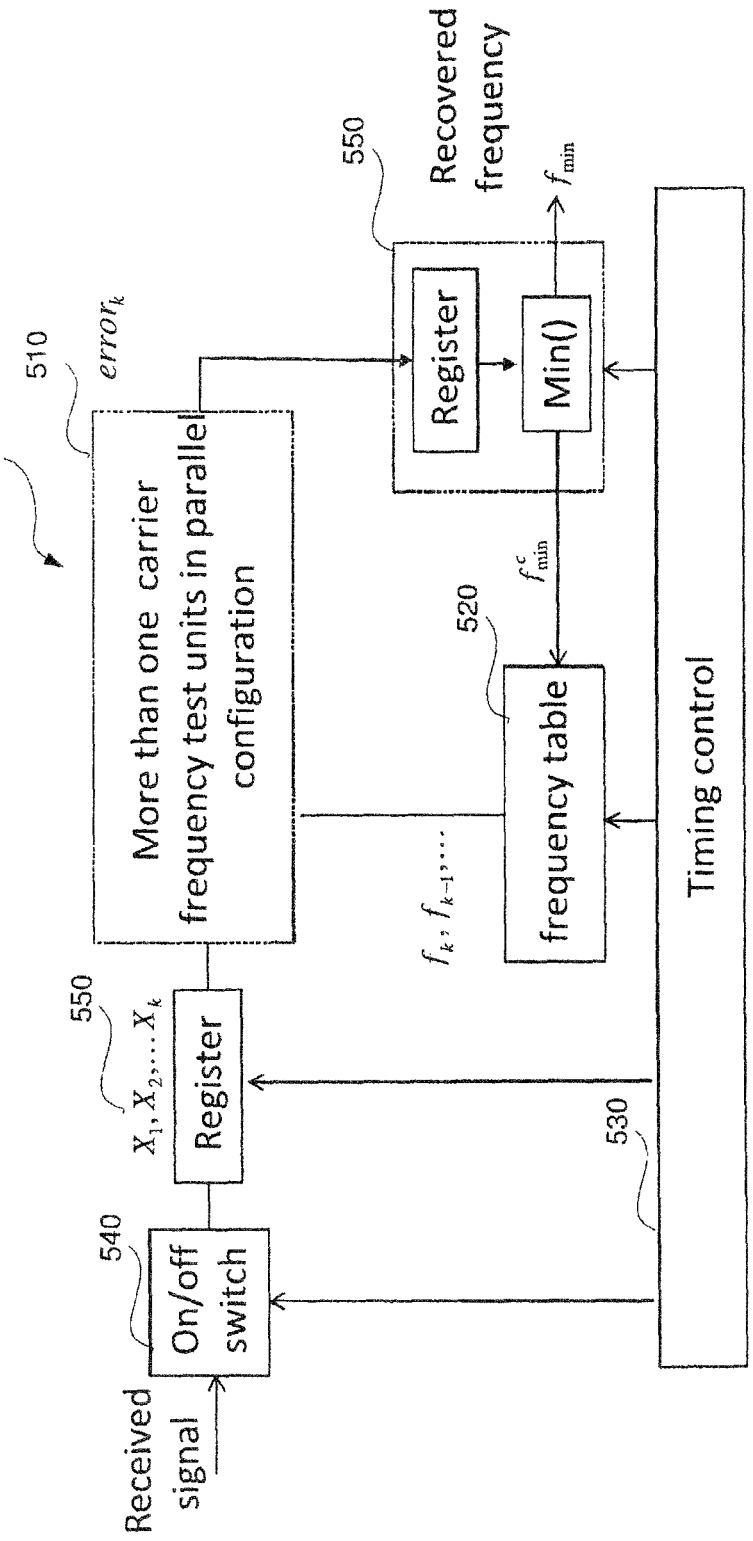
FIG. 5 shows an illustration of a third embodiment of a carrier frequency offset detection system according to systems and methods described herein.

FIG. 5 shows an illustration a third embodiment of a carrier frequency offset detection system 500 according to systems and methods described herein. The exemplary system 500 may include a plurality of parallel carrier frequency test units 510, a frequency table 520, a timing control 530, an on/off switch 540, and a plurality of registers 550.

As shown in FIG. 5, the exemplary system 500 utilizes a combination of the parallel processing architecture with the sequential processing architecture. The system 500 may provide a carrier recovery circuit design with various frequency tracking speed, and hardware-efficiency, that falls between the parallel processing structure of the system 200 and the sequential processing structure of the system 400. An exemplary circuit within the system 500 may perform the calculations and estimations of the frequency offset.

Figure 6:
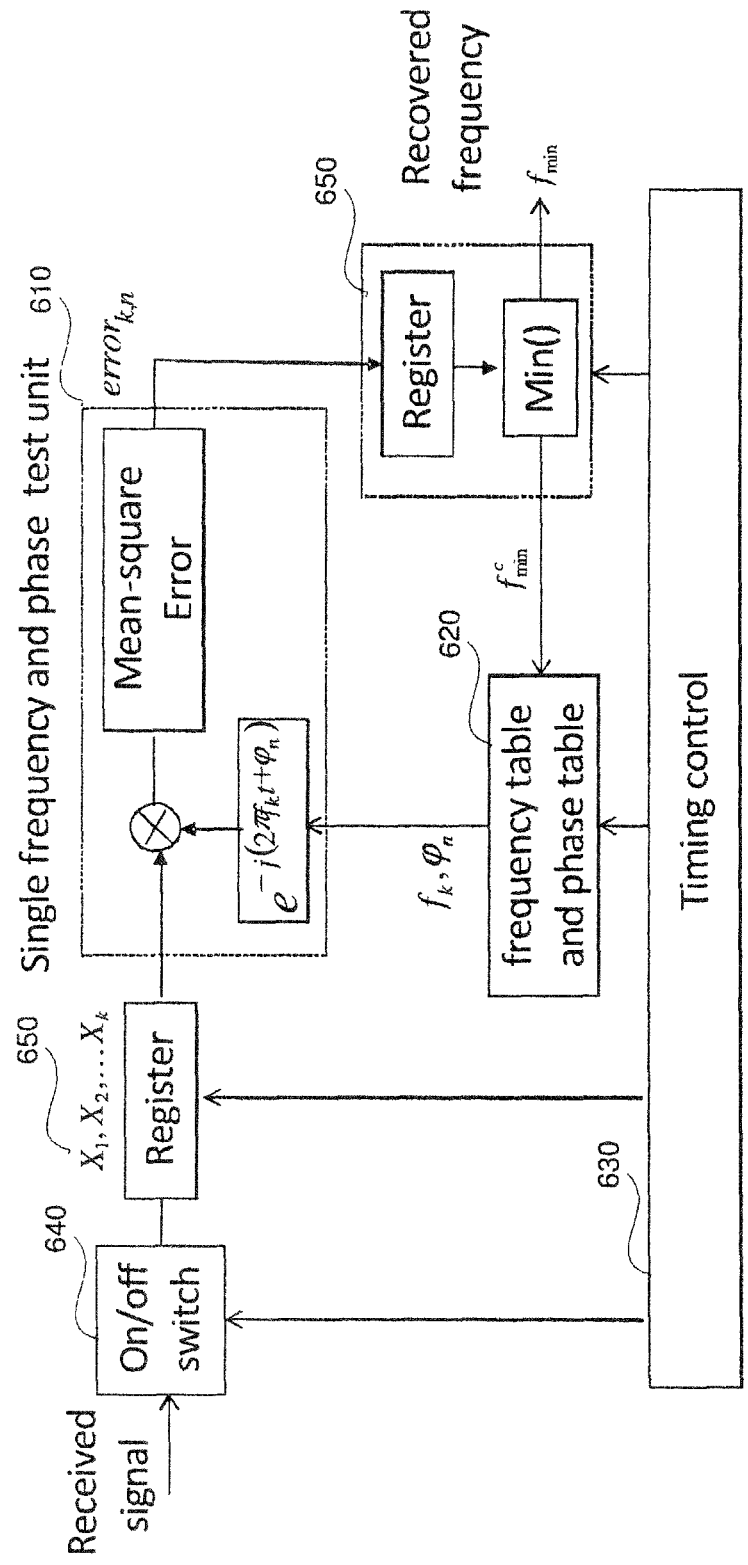
FIG. 6 shows an illustration of a further embodiment of a carrier frequency offset detection system according to systems and methods described herein.

FIG. 6 shows an illustration a further embodiment of a carrier frequency offset detection system 600 according to systems and methods described herein. The exemplary system 600 may include a single frequency and phase test unit 610, a frequency and phase tables 620, a timing control 630, an on/off switch 640, and a plurality of registers 650.

As shown in FIG. 6, the system 600 employs a single frequency and phase test unit in order to calculate the mean square errors of different test frequencies and test phases. The estimated carrier offset may then be the test frequency that gives the minimum mean square error. For the case that the phase recovery is achieved by using blind phase search based methods, the hardware implementation efficiency may be further improved by using the architecture of the system 600, as depicted in FIG. 6. An exemplary circuit within the system 600 may perform the calculations and estimations of the frequency offset.

Figure 7:
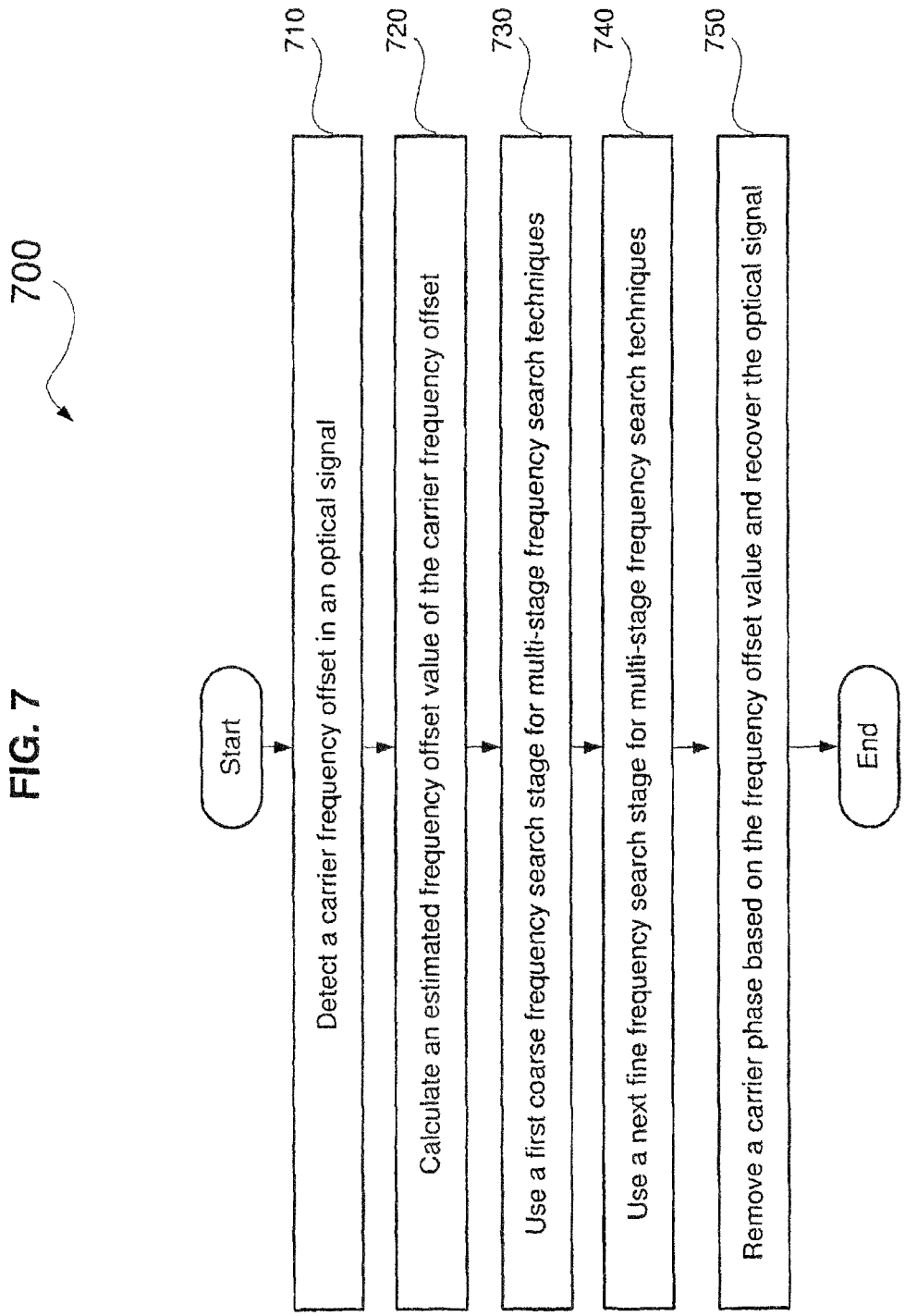
FIG. 7 shows an exemplary method for accurately estimating and removing a carrier frequency offset according to an exemplary embodiment described herein.

FIG. 7 shows an exemplary method 700 for accurately estimating and removing a carrier frequency offset according to an exemplary embodiment described herein. It should be noted that method 700 will be discussed with reference to various exemplary systems and components described above.

It should be noted that the exemplary method may be stored as a set of instructions or software code on a non-transitory computer readable storage medium, such as a computer memory. This set of instructions may be executable by a processor and may be operable at least to perform the steps of the exemplary method 700 depicted in FIG. 7.

Beginning with step 710, a frequency offset detection circuit may detect a carrier frequency offset in an optical signal. As noted above, the frequency offset detection circuit may utilize digital coherent detection to detect the carrier frequency offset.

In step 720, a frequency testing circuit may calculate an estimated frequency offset value of the carrier frequency offset. Specifically, the frequency testing circuit may utilize one or more frequency testing units, depending on the architecture of the system. In the event the system includes a parallel processing architecture, the frequency testing circuit may determine a minimum mean square error for each of the multiple tests simultaneously. In the event the system includes a sequential processing architecture, the frequency testing circuit may determine a minimum mean square error for each of the multiple tests at different intervals. In the event the system includes a combination processing architecture, the frequency testing circuit may use any combination of tests described above.

In step 730, the frequency testing circuit may utilize a first coarse frequency search stage for multi-stage frequency search techniques. As noted above, the frequency testing circuit may calculate mean square error versus test frequencies at a coarse frequency resolution of about 20 MHz frequency step using different number of continuous data symbols (i.e. block length). The frequency testing circuit may compare the results of the coarse frequency search and the test frequency that provides the minimum mean square error may be output to the next fine frequency search stage in step 740.

In step 740, the frequency testing circuit may utilize a next fine frequency search stage for multi-stage frequency search techniques. As noted above, the frequency testing circuit may calculate mean square error versus test frequencies at a fine frequency resolution of about 1 MHz frequency steps using different number of continuous data symbols (i.e. block length). The frequency testing circuit may compare the results of the fine frequency search and the test frequency that provides the minimum mean square error may be final estimated carrier frequency offset to be used in step 750.

In step 750, the frequency testing circuit may remove a carrier phase based on the estimated frequency offset value in order to recover the optical signal. As described above, the frequency testing circuit may remove a carrier phase using a phase rotation operation to generate a phase rotated signal.

Intradyne detection-based digital coherent receivers may allow for the carrier frequency of the received signal source different from the local oscillator while avoiding the need for complex optical phase locked loop ("PLL") in the optical system. As noted above, such a frequency offset may be estimated and removed in the digital domain (e.g., digital carrier frequency recovery) by way of any of the exemplary embodiments described herein.

As detailed above, these embodiments provide a multi-stage based blind frequency search method to accurately estimate the carrier frequency offset and remove the frequency offset. These embodiments may be implemented either with parallel processing based architecture to achieve very fast carrier frequency recovery, or with a sequential processing architecture to maximize hardware-efficient during carrier frequency recovery. Furthermore, a combination of parallel and sequential processing may be implemented in order to customize the tracking speed, as well as hardware-efficiency, to meet the needs of different system applications. For example, a burst-mode receiver may require very fast carrier recovery of the parallel embodiment while the normal continuous-operational receiver with high-quality laser may allow for relatively slow frequency recovery of the sequential embodiment. Furthermore, each of the embodiments described herein may be applicable to any modulation formats, such as QAM or polarization-multiplexed QAM, and for arbitrary frequency offset.

According to the exemplary methods and systems described above, digital coherent detection combined with the use of high-order QAM is an advantageous technique for achieving high-spectral efficiency optical transmission at a data rate beyond 100-Gb/s. In addition to higher speed and higher spectral efficiency, future optical networks may also require fast receiver acquisition time to provide fast wavelength provision. Furthermore, statistical multiplexing based optical packet network may be needed in the future transport network. For these advanced optical networks, fast carrier recovery in the coherent receiver is critical important.

Accordingly, the exemplary embodiments propose a blind carrier frequency recovery technique that may be used in these advanced optical networks for arbitrary modulation formats and having any frequency offset. Moreover, the exemplary embodiments not only can be implemented with parallel processing to achieve very fast frequency tracking speed, they may also be implemented with sequential processing to achieve very good hardware efficiency. By using a combination of parallel processing and sequential processing, different tracking speed, as well as hardware efficiency, may be realized by the various embodiments described above to meet the needs of different applications. Thus, the exemplary embodiments may provide universal carrier frequency recovery for any coherent receiver.

It will be apparent to those skilled in the art that various modifications may be made the exemplary embodiments, without departing from the spirit or the scope of the systems and methods described herein. Thus, it is intended that the exemplary embodiments cover modifications and variations of these systems and methods provided they come within the scope of the appended claimed and their equivalents.

What is claimed is:
1. A system, comprising:
a frequency offset detection circuit configured to detect a carrier frequency offset in an optical signal; and
a frequency testing circuit configured to calculate an estimated frequency offset value of the carrier frequency offset by:
generating a coarse phase error frequency based on rotating a plurality of samples of the optical signal by a corresponding one of a plurality of phase angles and selecting one of the plurality of phase angles having a lowest mean square error value as the coarse phase error frequency;
generating a plurality of fine test frequencies by applying a plurality of offsets to the coarse phase error frequency, the fine test frequencies being dispersed throughout a desired range of fine test frequencies, each of the fine test frequencies being separated from an adjacent one of the fine test frequencies by an interval determined based on a predetermined quantity of the fine test frequencies, and selecting as the estimated frequency offset value, one of the fine test frequencies based on a mean square error,
wherein the frequency testing circuit is configured to remove a carrier phase from the optical signal based on the estimated frequency offset value to recover the optical signal.

2. The system of claim 1, wherein the frequency offset detection includes a parallel processing architecture for multi-stage frequency detection.

3. The system of claim 2, wherein the parallel processing architecture includes a plurality of frequency testing units performing multiple tests simultaneously, and the frequency testing circuit is configured to determine the mean square error for each of the multiple tests simultaneously.

4. The system of claim 1, wherein the frequency offset detection includes a sequential processing architecture for single-stage frequency detection.

5. The system of claim 4, wherein the sequential processing architecture includes a single frequency testing unit and the frequency testing circuit is configured to determine the mean square error for each of multiple tests at different intervals.

6. The system of claim 1, wherein the frequency offset detection circuit includes a combination architecture having a parallel processing architecture and a sequential processing architecture for multi-stage frequency detection.

7. The system of claim 1, wherein the optical signal is used to transport data in a statistical multiplexing based optical packet network.

8. The system of claim 1, wherein the estimated frequency offset value is determined based on 64 continuous data symbols.

9. The system of claim 1, wherein 40 fine test frequencies are generated.

10. The system of claim 1, wherein 29 fine test frequencies are generated.

11. A method, comprising:
    detecting a carrier frequency offset in an optical signal;
    calculating an estimated frequency offset value of the carrier frequency offset by generating a coarse phase error frequency based on rotating a plurality of samples of the optical signal by a corresponding one of a plurality of phase angles and selecting one of the plurality of phase angles having a lowest mean square error value as the coarse phase error frequency and generating a plurality of fine test frequencies by applying a plurality of offsets to the coarse phase error frequency, the fine test frequencies being dispersed throughout a desired range of fine test frequencies, each of the fine test frequencies being separated from an adjacent one of the fine test frequencies by an interval determined based on a predetermined quantity of the fine test frequencies, and selecting, as the estimated frequency offset value, one of the fine test frequency based on a mean square error;
    removing a carrier phase from the optical signal based on the estimated frequency offset value; and
    recovering the optical signal.

12. The method of claim 11, wherein the carrier frequency offset detection includes parallel multi-stage frequency detection.

13. The method of claim 12, wherein the parallel multi-stage frequency detection includes performing multiple tests simultaneously and determining the mean square error for each of the multiple tests simultaneously.

14. The method of claim 11, wherein the carrier frequency offset detection includes sequential single-stage frequency detection.

15. The method of claim 14, wherein the sequential single-stage frequency detection and determining the mean square error for each of multiple tests at different intervals.

16. The method of claim 11, wherein the carrier frequency offset detection includes parallel multi-stage frequency detection and sequential single-stage frequency detection.

17. The method of claim 11, wherein the optical signal is used to transport data in a statistical multiplexing based optical packet network.

18. A circuit, comprising:
    a calculation component that calculates an estimated frequency offset value of a carrier frequency offset by generating a coarse phase error frequency based on rotating a plurality of samples in an optical signal by a corresponding one of a plurality of phase angles and selecting one of the plurality of phase angles having a lowest mean square error value as the coarse phase error frequency and generating a plurality of fine test frequencies by applying a plurality of offsets to the coarse phase error frequency, the fine test frequencies being dispersed throughout a desired range of fine test frequencies, each of the fine test frequencies being separated from an adjacent one of the fine test frequencies by an interval determined based on a predetermined quantity of the fine test frequencies, and selecting, as the estimated frequency offset value, one of the fine test frequencies based on a mean square error.

19. The circuit of claim 18, further comprising:
    a detection component that detects the carrier frequency offset in an optical signal;
    a phase removal component that removes a carrier phase from the optical signal based on the estimated frequency offset value; and
    a signal recovery component that recovers the optical signal.

20. The circuit of claim 19, wherein the detection component includes one of a parallel processing architecture for multi-stage frequency detection, a sequential processing architecture for single-stage frequency detection, and a combination architecture for multi-stage frequency detection.

* * * * *